United States Patent
Uchide

(10) Patent No.: US 11,281,853 B2
(45) Date of Patent: Mar. 22, 2022

(54) ONTOLOGY CREATION ASSISTANCE DEVICE

(71) Applicant: Mitsubishi Electric Corporation, Tokyo (JP)

(72) Inventor: Hayato Uchide, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 293 days.

(21) Appl. No.: 16/476,347

(22) PCT Filed: Mar. 6, 2017

(86) PCT No.: PCT/JP2017/008766
§ 371 (c)(1),
(2) Date: Jul. 8, 2019

(87) PCT Pub. No.: WO2018/163241
PCT Pub. Date: Sep. 13, 2018

(65) Prior Publication Data
US 2020/0050657 A1    Feb. 13, 2020

(51) Int. Cl.
*G06F 16/36* (2019.01)
*G06F 40/186* (2020.01)
(Continued)

(52) U.S. Cl.
CPC .......... *G06F 40/186* (2020.01); *G06F 16/367* (2019.01); *G06F 17/16* (2013.01); *G06K 9/685* (2013.01)

(58) Field of Classification Search
CPC ............. G06F 16/9024; G06F 16/2453; G06F 16/367; G06F 16/2455; G06F 40/30; G06F 16/24522; G06F 16/3331; G06F 16/3344; G06F 16/322; G06F 16/9027; G06F 40/186; G06F 40/40; G06N 5/022; G06N 5/02

See application file for complete search history.

(56) References Cited

U.S. PATENT DOCUMENTS 8,335,754 B2 * 12/2012 Dawson ................ G06F 16/322
706/45
11,188,580 B2 * 11/2021 Osmon .................... G06N 5/02
(Continued)

FOREIGN PATENT DOCUMENTS

| JP | 2001-14166 A | 1/2001 |
| JP | 2009-70133 A | 4/2009 |

OTHER PUBLICATIONS

Abedjan, Ziawasch., "Improving RDF data with data mining", 2014, Diss. Universität Potsdam, 2014, pp. 1-123.*
(Continued)

*Primary Examiner* — Olujimi A Adesanya
(74) *Attorney, Agent, or Firm* — Birch, Stewart, Kolasch & Birch, LLP

(57) ABSTRACT

A search unit (13) searches an ontology database (11) for a node set similar to a given word. A template creating unit (14) creates a template from common properties and nodes possessed by nodes included in the node set that has been searched for. An additional information determining unit (15) creates a triple by connecting the template to a node having the given word as a name, uses the created triple as display data, and when a triple is given, registers the given triple in the ontology database (11).

3 Claims, 5 Drawing Sheets

(51) Int. Cl.
    *G06F 17/16*     (2006.01)
    *G06K 9/68*      (2006.01)

(56)        References Cited

U.S. PATENT DOCUMENTS

| | | | |
|---|---|---|---|
| 2003/0158851 A1* | 8/2003 | Britton | G06F 16/2477 |
| 2008/0294644 A1* | 11/2008 | Liu | G06F 16/335 |
| 2009/0077074 A1 | 3/2009 | Hosokawa | |
| 2011/0246407 A1* | 10/2011 | Lee | G06N 5/04 |
| | | | 706/47 |
| 2011/0320187 A1* | 12/2011 | Motik | G06F 40/30 |
| | | | 704/9 |
| 2012/0271787 A1* | 10/2012 | Lee | G06F 16/367 |
| | | | 706/48 |
| 2013/0260358 A1* | 10/2013 | Lorge | G06F 40/30 |
| | | | 434/362 |
| 2013/0262361 A1* | 10/2013 | Arroyo | G06F 16/245 |
| | | | 706/46 |
| 2014/0297653 A1* | 10/2014 | Liu | G06F 16/245 |
| | | | 707/747 |
| 2015/0019589 A1* | 1/2015 | Arroyo | G06F 16/245 |
| | | | 707/779 |
| 2016/0034538 A1* | 2/2016 | Oberle | H04L 67/02 |
| | | | 707/722 |
| 2016/0092554 A1* | 3/2016 | Srinivasan | G06F 16/248 |
| | | | 707/798 |
| 2016/0132572 A1* | 5/2016 | Chang | G06F 16/243 |
| | | | 707/723 |
| 2016/0371355 A1* | 12/2016 | Massari | G06F 16/25 |
| 2017/0337268 A1* | 11/2017 | Ait-Mokhtar | G06F 16/367 |
| 2019/0034811 A1* | 1/2019 | Cuddihy | G06N 5/04 |

OTHER PUBLICATIONS

Mikolov et al. "Efficient Estimation of Word Representations in Vector Space" ICLR, Sep. 7, 2013, p. 1-12.

* cited by examiner

ONTOLOGY CREATION ASSISTANCE DEVICE

TECHNICAL FIELD

The present invention relates to an ontology creation assistance device for assisting creation of an ontology described in an ontology description language.

BACKGROUND ART

With progress in information processing technology in recent years, a knowledge base and a knowledge database have become large-scaled. In particular, when a knowledge base system or a knowledge database system distributed on a network is used, it is required to process a large amount of data efficiently. Such a knowledge base or knowledge database system is created in accordance with creation rules of the corresponding system.

As described above, in order to use data of a knowledge base system or a knowledge database system distributed on a network, it is convenient if the data can be classified and hierarchized in accordance with a certain standard. As a powerful method therefor, an ontology is attracting attention.

The ontology includes concepts themselves or terms themselves related to a domain and information that clearly defines a relationship between the concepts or between the terms, and is described using an ontology description language.

A first example of the ontology description language is Web Ontology Language (OWL) which is technology for systematically expressing vocabulary and knowledge existing on the WEB and a relationship therebetween, recommended by The World Wide Web Consortium (W3C). OWL expresses a predictable class system of vocabulary with a set called a triple, constituted by a subject that is an element equivalent to "who", a predicate equivalent to "what", and an object equivalent to "what value" in Resource Description Framework (RDF). Here, the subject/object is called a node, and the predicate is called a property. Hereinafter, this triple will be described as a triple described in the ontology description language.

Work of creating an original ontology has mostly been done manually. However, in order to create a highly accurate ontology, it is necessary to be familiar with an ontology, and thus it is difficult to create an ontology for a person other than some experts disadvantageously. Furthermore, as the number of data items constituting data increases, it takes more labor and time to select a property corresponding to each data item disadvantageously. Therefore, conventionally, as illustrated in, for example, Patent Literature 1, there has been an ontology creation assistance device for associating existing ontologies with each other.

CITATION LIST

Patent Literatures

Patent Literature 1: JP 2009-70133 A

SUMMARY OF INVENTION

Technical Problem

However, in the conventional ontology creation assistance device, metadata as prior knowledge which is specialized for association of ontologies and is used for associating a data item with an existing ontology is necessary, and thus a load of ontology creation work cannot be necessarily reduced.

The present invention has been achieved in order to solve such a problem, and an object of the present invention is to provide an ontology creation assistance device capable of reducing the load of ontology creation work.

Solution to Problem

An ontology creation assistance device according to the present invention includes: a processor to execute a program; and
a memory to store the program which, when executed by the processor, performs processes of, searching an ontology database in which a triple described in an ontology description language is registered for a node set similar to a given word; creating, from common properties and nodes possessed by nodes included in the node set that has been searched for, a template for creating a triple including a node to be newly added; and creating a triple by connecting the template created to a node having the given word as a name, using the created triple as display data, and when a triple is given, registering the given triple in the ontology database.

Advantageous Effects of Invention

The ontology creation assistance device according to the present invention creates, from common properties and nodes possessed by nodes included in a node set similar to a given word, a template for creating a triple including a node to be newly added, creates a triple by connecting the template to a node having the given word as a name, uses the created triple as display data, and when a triple that has been corrected with respect to the display data, for example, is given, registers the given triple in the ontology database. As a result, the load of the ontology creation work can be reduced.

DESCRIPTION OF EMBODIMENTS

Hereinafter, in order to describe the present invention in more detail, an embodiment for carrying out the present invention will be described with reference to the attached drawings.

First Embodiment

Figure 1:
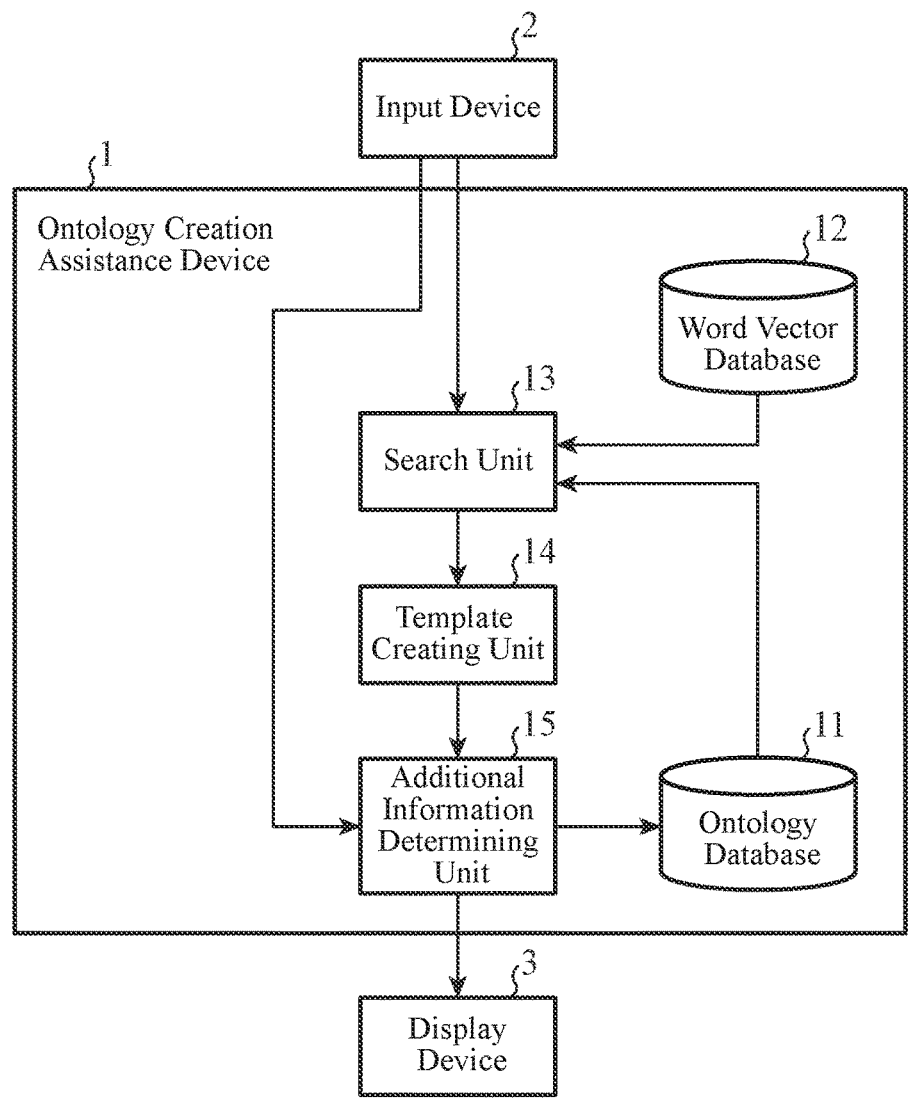
FIG. 1 is a configuration diagram of an ontology creation assistance device according to a first embodiment of the present invention.

FIG. 1 is a configuration diagram illustrating an ontology creation assistance device according to the present embodiment.

As illustrated, an ontology creation assistance device 1 includes an ontology database 11, a word vector database 12, a search unit 13, a template creating unit 14, and an additional information determining unit 15. The ontology database 11 is a database in which a set of triples described in an ontology description language is registered. The word vector database 12 is a database in which a set of word vectors used by the search unit 13 for searching for a similar node set is registered. This word vector database 12 may be constituted, for example, using the technology described in a literature: Tomas Mikolov, Kai Chen, Greg Corrado, and Jeffrey Dean, Efficient Estimation of Word Representations in Vector Space, ICLR 2013. The search unit 13 is a processing unit for searching existing ontologies stored in the ontology database 11 for a set of nodes each having a name similar to a word input from an input device 2. The template creating unit 14 is a processing unit for creating a template used for creating a triple to which common properties possessed by nodes in a search result output by the search unit 13 is newly added. The additional information determining unit 15 is a processing unit for creating a triple by connecting the template created by the template creating unit 14 to a node having a given word as a name thereof, outputting the triple as display data to a display device 3, and when a triple that has been corrected with respect to the display data, for example, is given from the input device 2, registering the given triple in the ontology database 11.

Figure 2:
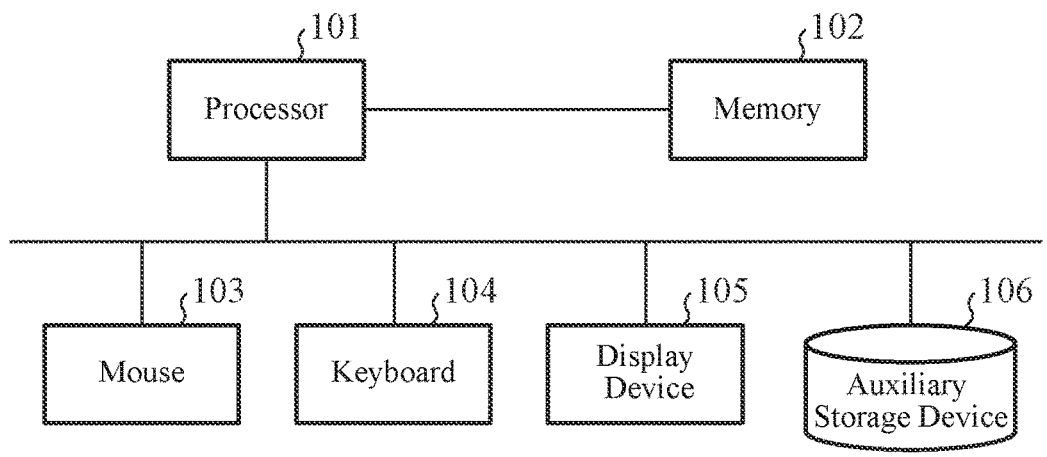
FIG. 2 is a hardware configuration diagram of the ontology creation assistance device according to the first embodiment of the present invention.

FIG. 2 is a hardware configuration diagram for implementing the ontology creation assistance device illustrated in FIG. 1. As illustrated, hardware for implementing the ontology creation assistance device includes a processor 101, a memory 102, a mouse 103, a keyboard 104, a display device 105, and an auxiliary storage device 106. The processor 101 is a processor for implementing the functional units of the search unit 13, the template creating unit 14, and the additional information determining unit 15 by executing programs corresponding to the search unit 13, the template creating unit 14, and the additional information determining unit 15. The memory 102 is a storage unit for holding a program at the time when the program is executed by the processor 101 and for constituting a work area for the processor 101. The mouse 103 and the keyboard 104 are peripheral devices corresponding to the input device 2 for performing data input by an operation of a user. The display device 105 is a peripheral device such as a display for displaying output data from the ontology creation assistance device 1 and corresponds to the display device 3 illustrated in FIG. 1. The auxiliary storage device 106 is a storage device for holding the ontology database 11 and the word vector database 12 and for storing the programs corresponding to from the search unit 13 to the additional information determining unit 15. However, the auxiliary storage device 106 does not necessarily have to be present inside the device, and a storage device present on the cloud may be used via a communication interface.

Next, the operation of the ontology creation assistance device according to the first embodiment will be described.

Figure 3:
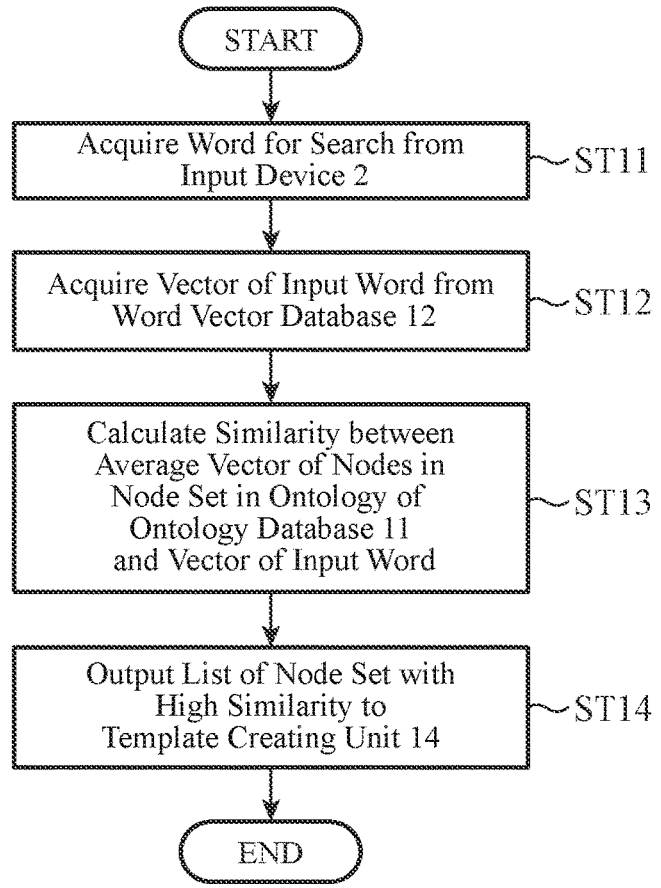
FIG. 3 is a flowchart illustrating an operation of a search unit in the ontology creation assistance device according to the first embodiment of the present invention.

The search unit 13 searches, by using the word vector database 12, the ontology database 11 for a node name similar to a word input by a user. A specific operation of the search unit 13 is illustrated in the flowchart of FIG. 3. First, the search unit 13 acquires a word input by a user through the input device 2 from the input device 2 (step ST11). Next, the search unit 13 searches the word vector database 12 and acquires a vector of the input word (step ST12). Next, the search unit 13 searches the ontology database 11 using the vector of the input word acquired in step ST12. Similarity between vectors is used for search. It is conceivable to use a Euclidean distance indicated in formula (1) and cosine similarity indicated in formula (2) for calculating the similarity between vectors (step ST13).

$$d(\vec{a}, \vec{b}) = \sqrt{(a_1 - b_1)^2 + (a_2 - b_2)^2 + \ldots + (a_n - b_n)^2} \quad \text{Formula (1)}$$

$$\cos(\vec{a}, \vec{b}) = \frac{a_1 b_1 + \ldots + a_n b_n}{\sqrt{a_1^2 + \ldots + a_n^2} \sqrt{b_1^2 + \ldots + b_n^2}} \quad \text{Formula (2)}$$

Note that $\vec{a} = (a_1, a_2, \ldots a_n)$ and $\vec{b} = (b_1, b_2, \ldots b_n)$ are satisfied.

An example of the calculation of the similarity in step ST13 will be described. When a triple is constituted by connecting a plurality of nodes with different names to a specific node via the same property, the plurality of nodes with different names is defined as a node set. When the search unit 13 searches the ontology database 11, an average vector of nodes included in a node set calculated in advance is used for calculating the similarity.

Figure 4:
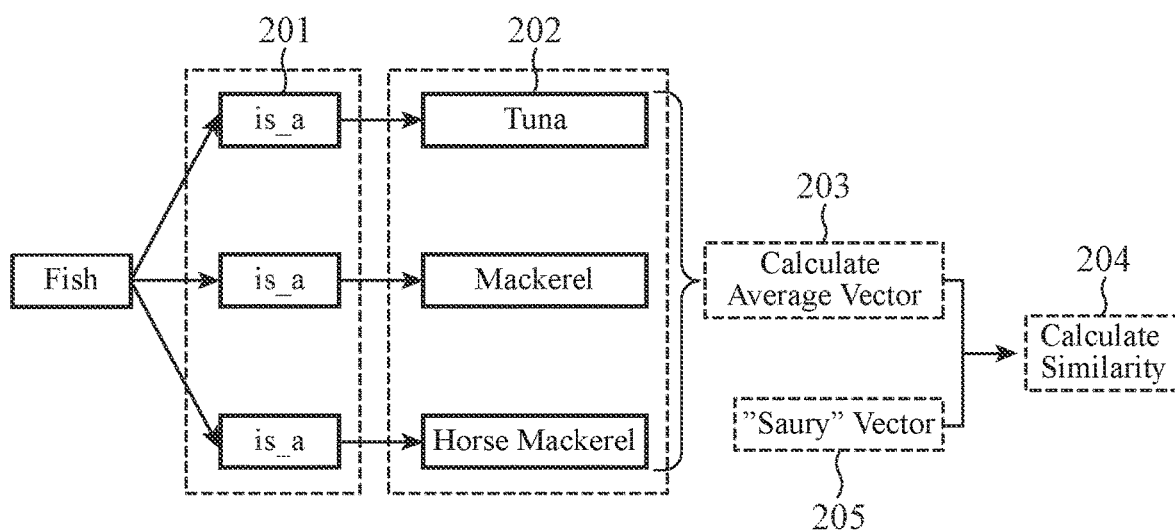
FIG. 4 is an explanatory diagram of similarity calculation by the search unit in the ontology creation assistance device according to the first embodiment of the present invention.

An example of similarity calculation is illustrated in FIG. 4. In step ST11, if a word input from a user is "saury", the search unit 13 acquires a vector of "saury" in step ST12. Next, a case where the similarity is calculated for a plurality of nodes "tuna", "mackerel", and "horse mackerel" each connected to a "fish" node registered in the ontology database 11 via a property "is_a" will be described. At this time, "tuna", "mackerel", and "horse mackerel" are each connected to the "fish" node via the same property 201 "is_a", and are therefore regarded as a node set 202, and an average vector of "tuna", "mackerel", and "horse mackerel" is calculated (see dashed line frame 203). Similarity calculation 204 is calculated between a vector 205 of "saury" acquired in step ST12 and an average vector of the node set in the dashed line frame 203. As a result of the calculation, if the similarity is equal to or more than a threshold, the search unit 13 adds "tuna", "mackerel", and "horse mackerel" to a list of node set that is to be output to the template creating unit 14 (step ST14). Note that the threshold is manually defined in advance. For example, the threshold for the similarity is set to 0.5 or the like.

In this way, by using the similarity between the vector of a word input from a user and the average vector of nodes regarded as a node set in the ontology, it is possible to search for a node and a property of an ontology having a high probability of connection to the word input from the user.

Figure 5:
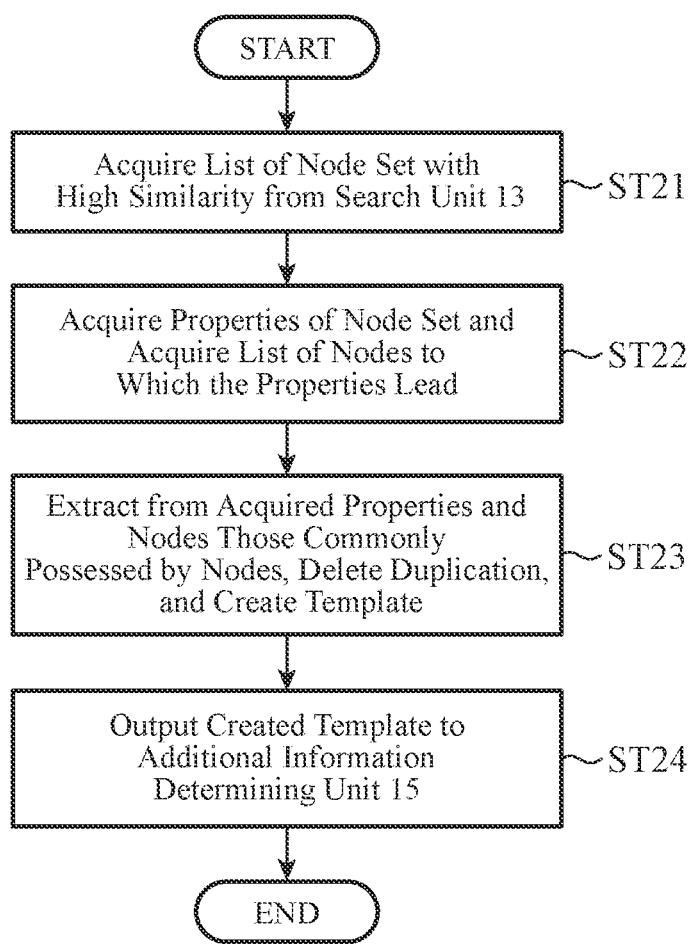
FIG. 5 is a flowchart illustrating an operation of a template creating unit in the ontology creation assistance device according to the first embodiment of the present invention.
Figure 6A:
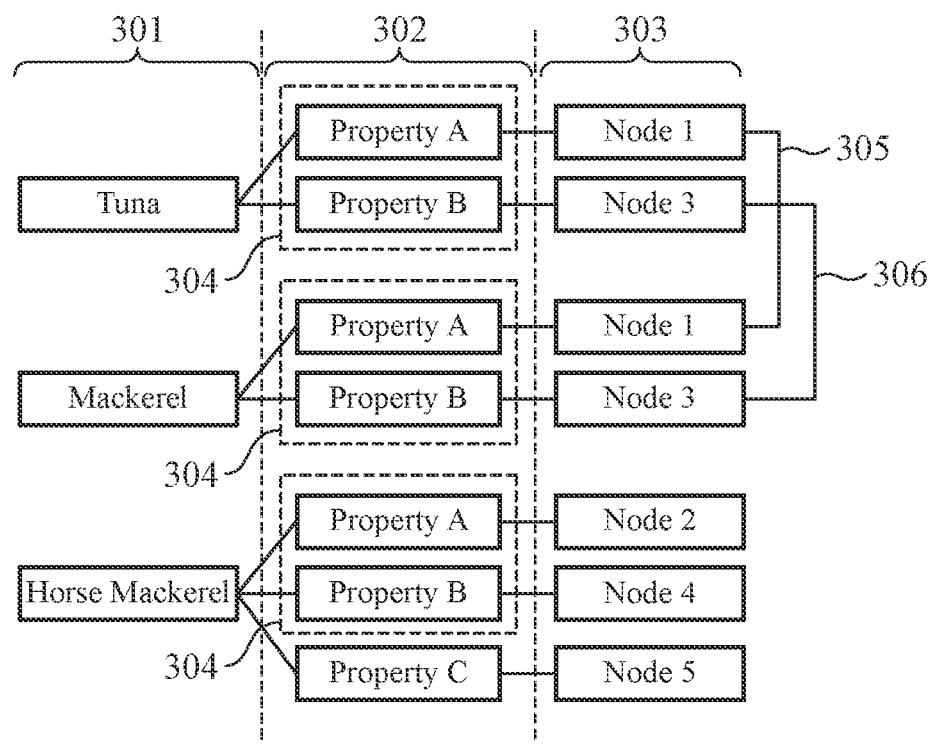
FIGS. 6A and 6B are explanatory diagrams of template creation in the ontology creation assistance device according to the first embodiment of the present invention.

Next, the template creating unit 14 creates a template for creating a triple to be registered in the ontology database 11 from the list of node set with high similarity output from the search unit 13. A specific operation is illustrated in the flowchart of FIG. 5. An example of template creation is illustrated in FIG. 6. FIG. 6A illustrates the list of node set with high similarity, and illustrates a relationship among a list 301 of nodes included in the node set, a list 302 of properties, and a list 303 of nodes. In the list 302 of properties, properties enclosed by a dashed line frame 304 indicate properties commonly possessed by nodes.

Figure 6B:
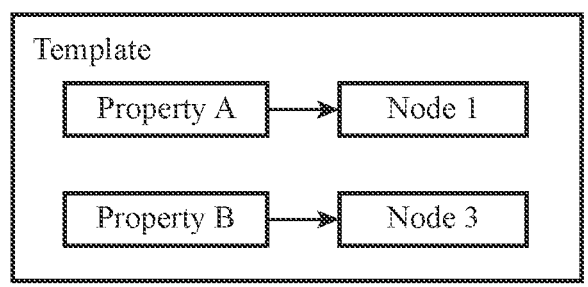

First, the template creating unit 14 acquires a list of node set with high similarity from the search unit 13 (step ST21). Next, the template creating unit 14 acquires lists of properties and nodes possessed by nodes included in the acquired node set (step ST22). Properties and nodes commonly possessed by nodes are extracted from the acquired lists of properties and nodes, duplication is deleted, and a template is created (step ST23). Here, for a condition of properties and nodes as extraction targets, a threshold is set in advance with the number of nodes or the like. For example, the properties and nodes as extraction targets are properties and nodes commonly possessed by two or more nodes. In the example of FIG. 6A, common properties possessed by "tuna", "mackerel", and "horse mackerel" nodes are "property A" and "property B". A node commonly connected to "property A" and satisfying the extraction target condition is "node 1", and a node commonly connected to "property B" and satisfying the extraction target condition is "node 3". Therefore, the template creating unit 14 outputs, to the additional information determining unit 15, a combination of "property A" and "node 1" (305) connected therebetween and a combination of "property B" and "node 3" (306) connected therebetween, as a template (step ST24). FIG. 6B illustrates the created template.

As described above, by using, as a template, properties and nodes commonly possessed by nodes included in a node set with high similarity output by the search unit 13, the template creating unit 14 can automatically connect a property and a node that are possessed with high probability by a node of an ontology having a meaning close to a word input from a user, and therefore can simplify node registration work as the ontology creation assistance device 1.

Figure 7:
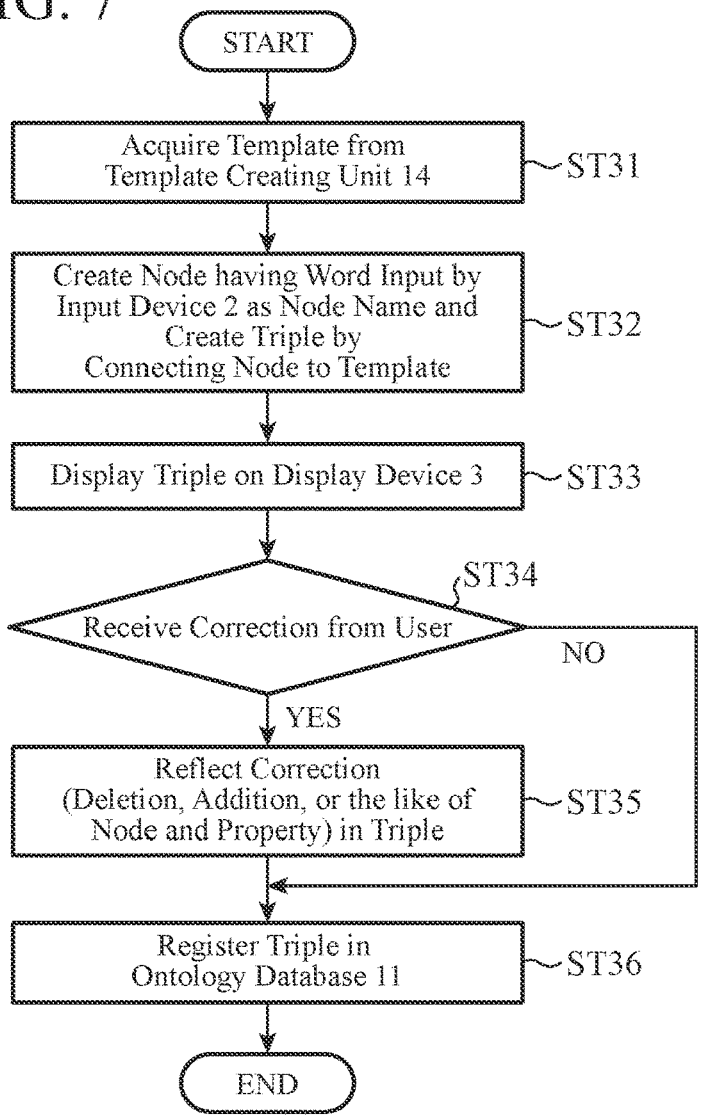
FIG. 7 is a flow chart illustrating an operation of an additional information determining unit in the ontology creation assistance device according to the first embodiment of the present invention.
Figure 8:
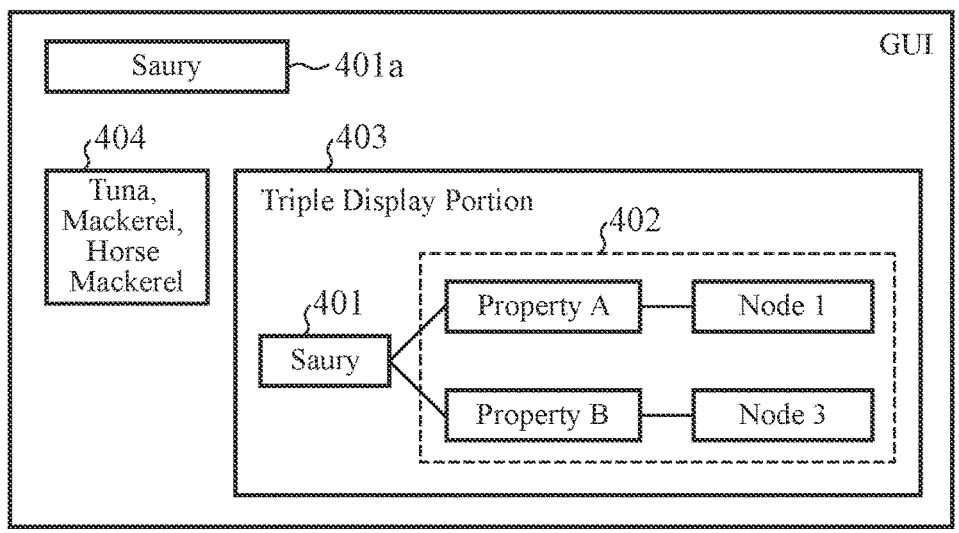
FIG. 8 is an explanatory diagram illustrating an example of GUI display presented to a user in the ontology creation assistance device according to the first embodiment of the present invention.

The additional information determining unit 15 creates a triple by connecting a template output from the template creating unit 14 to a node having the name of a word input by a user, and presents the triple to the user using the display device 3. The user corrects the presented triple using the mouse 103 and the keyboard 104 if necessary. The additional information determining unit 15 registers the corrected triple in the ontology database 11. A specific operation is illustrated in the flowchart of FIG. 7. FIG. 8 illustrates an example of GUI display presented to the user.

First, the additional information determining unit 15 acquires a template from the template creating unit 14 (step ST31). Next, the additional information determining unit 15 creates a node having a word input by the input device 2 as a node name and creates a triple by connecting the node to the template (step ST32). For example, as illustrated in FIG. 8, the created triple is displayed on the display device 3 and presented to the user (step ST33). That is, as illustrated, a triple display portion 403 is created by connection of a template portion 402 to a newly added node name 401. Note that a newly added node name 401*a* and similar node names 404 are created outside the triple display portion 403.

The user confirms the created triple. When the user determines that correction is necessary, the user corrects the triple on GUI using the mouse 103 and the keyboard 104. The additional information determining unit 15 determines whether a correction input has been made by the input device 2 (step ST34). If a correction input has been made (step ST34—YES), the correction is reflected in the triple (step ST35), and the corrected triple is registered in the ontology database 11 (step ST36). If a correction input has not been made by the input device 2 (step ST34—NO), the additional information determining unit 15 registers the triple displayed on the display device 3 in step ST33 in the ontology database 11 as it is (step ST36).

Due to this, the user only needs to determine whether or not a property and a node connected to a node to be newly added are necessary, and therefore an ontology can be created more efficiently than in prior art.

When the created triple is displayed, the additional information determining unit 15 may change a display method depending on the number of properties and nodes stored in the template created by the template creating unit 14 and the number of properties and nodes that are a source of the template. For example, in the case of the template illustrated in FIG. 6B, as illustrated in FIG. 6A, the number of nodes having property A is three, and among them, the number of nodes having node 1 is two. Therefore, the display method is changed by increasing the density of the color of an area of property A, reducing the density of the color of an area of node 1, and the like at the time of display.

Due to this, it is possible to visually determine the ratio of commonly connected properties and nodes stored in the template to connected properties and nodes in the node set that is the source of the template, thereby assisting determination of necessity at the time of correction of a triple.

As described above, the ontology creation assistance device according to the first embodiment includes: a search unit for searching an ontology database in which a triple described in an ontology description language is registered for a node set similar to a given word; a template creating unit for creating, from common properties and nodes possessed by nodes included in the node set that has been searched for by the search unit, a template for creating a triple including a node to be newly added; and an additional information determining unit for creating a triple by connecting the template created by the template creating unit to a node having the given word as a name, using the created triple as display data, and when a triple is given, registering the given triple in the ontology database. Therefore, a load of ontology creation work can be reduced.

In addition, according to the ontology creation assistance device according to the first embodiment, the additional information determining unit, when a corrected triple with respect to the display data is given, registers the corrected triple in the ontology database. Therefore, the triple can be corrected, and this corrected triple can be registered in the ontology database.

In addition, according to the ontology creation assistance device according to the first embodiment, the template creating unit extracts, from the common properties and nodes, a property and a node satisfying a set extraction target condition, and creates the template, and the additional information determining unit uses, as the display data, data in a display form indicating a ratio of the number of the common properties and nodes to the number of the extracted property and node. Therefore, this assists determination of necessity at the time of correction of a triple and makes it possible to more reduce a load of ontology creation work.

Note that any component in the embodiment can be modified, or any component in the embodiment can be omitted within the scope of the present invention.

INDUSTRIAL APPLICABILITY

As described above, the ontology creation assistance device according to the present invention relates to a configuration for assisting creation of an ontology including concepts themselves or terms themselves related to a domain and information that clearly defines a relationship between the concepts or between the terms, and described using an ontology description language, and is suitable for use for a knowledge base or a knowledge database system.

REFERENCE SIGNS LIST

1: Ontology creation assistance device, 2: Input device, 3: Display device, 11: Ontology database, 12: Word vector database, 13: Search unit, 14: Template creating unit, 15: Additional information determining unit.

The invention claimed is:

1. An ontology creation assistance device comprising:
   an input device via which a word is inputted;
   a data storage device on which is stored,
      a word vector database in which a plurality of vectors are registered in association with respective words, and
      an ontology database in which a plurality of triples written in an ontology description language are registered, and in which a plurality of node sets are defined among the registered triples, each of the plurality of node sets being comprised of a plurality of nodes of different names connected to a common node via a common property, each of the plurality of node sets being stored in the ontology database in association with an average vector of the corresponding node set;
   a processor to execute a program; and
   a memory to store the program which, when executed by the processor, performs processes of,
      searching the word vector database to extract a vector corresponding to the inputted word;
      searching the ontology database to extract, from the plurality of node sets, a node set similar to the inputted word by comparing the extracted vector to the average vectors stored in association with the plurality of node sets in the ontology database;
      creating, from common properties and nodes possessed by nodes included in the node set extracted as result of searching the ontology database, a template for creating a triple including a node to be newly added; and
      creating a triple by connecting the template created to a node having the inputted word as a name, using the created triple as display data that is displayed to a user, and upon receiving confirmation via user input, updating the ontology database by registering the created triple or a user-corrected version of the created triple in the ontology database,
   wherein the updated ontology database is incorporated as part of a knowledge base system or knowledge database system distributed on a network.

2. The ontology creation assistance device according to claim 1, wherein the processes include, when a corrected triple is inputted by the user with respect to the display data, the corrected triple is registered in the ontology database.

3. The ontology creation assistance device according to claim 2, wherein
   the processes include extracting, from the common properties and nodes, a property and a node satisfying a set extraction target condition, and creating the template, and
   using, as the display data, data in a display form indicating a ratio of the number of the common properties and nodes to the number of the extracted property and node.

* * * * *